United States Patent
Balachandran

[19]

[11] Patent Number: 6,073,004
[45] Date of Patent: Jun. 6, 2000

[54] EMERGENCY CALL INITIATOR

[75] Inventor: Shridharan Balachandran, Garland, Tex.

[73] Assignee: Ericsson Inc., Research Triangle Park, N.C.

[21] Appl. No.: 08/768,315

[22] Filed: Dec. 17, 1996

[51] Int. Cl.$^7$ .......................... H04M 11/00; H04M 11/04
[52] U.S. Cl. ............................ 455/404; 379/39; 455/457
[58] Field of Search ................................. 379/39, 40, 43, 379/45, 51; 455/404, 456, 459; 342/357

[56] References Cited

U.S. PATENT DOCUMENTS

| | | | |
|---|---|---|---|
| Re. 35,920 | 10/1998 | Sorden et al. | 342/457 |
| 3,646,583 | 2/1972 | Scuderi | 340/436 |
| 4,371,751 | 2/1983 | Hilligoss, Jr. et al. | 379/41 |
| 5,109,399 | 4/1992 | Thompson | 379/45 |
| 5,117,449 | 5/1992 | Metroka et al. | 455/552 |
| 5,223,844 | 6/1993 | Mansell et al. | 342/357 |
| 5,311,197 | 5/1994 | Sorden et al. | 342/457 |
| 5,334,974 | 8/1994 | Simms et al. | 340/990 |
| 5,337,342 | 8/1994 | Kruger et al. | 379/40 |
| 5,388,147 | 2/1995 | Grimes | 455/404 |
| 5,515,043 | 5/1996 | Berard et al. | 340/988 |
| 5,515,285 | 5/1996 | Garrett, Sr. et al. | 364/460 |
| 5,517,199 | 5/1996 | DiMattei | 342/357 |
| 5,561,840 | 10/1996 | Alvesalo et al. | 455/433 |
| 5,574,427 | 11/1996 | Cavallaro | 340/436 |
| 5,579,375 | 11/1996 | Ginter | 455/417 |
| 5,686,910 | 11/1997 | Timm et al. | 340/988 |
| 5,745,849 | 4/1998 | Britton | 455/404 |
| 5,835,907 | 11/1998 | Newman | 707/10 |
| 5,914,675 | 6/1999 | Tognazzini | 340/989 |

FOREIGN PATENT DOCUMENTS

| | | |
|---|---|---|
| 2 282 936 | 4/1995 | United Kingdom. |
| WO 95/00860 | 1/1995 | WIPO. |
| WO 97/39594 | 10/1997 | WIPO. |
| PCT/US97/22607 | 12/1997 | WIPO. |

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A system and method for enabling emergency call initiations in response to the detection of a vehicle accident is disclosed. A number of sensors located about the vehicle, for example, air bag deployment sensors, initiate call activation signals upon detection of a vehicle accident. The emergency call activation signal is transmitted to an associated cellular telephone unit via wireline or non-wireline communications, and a timer initiates a timeout period. Once the timer has measured the proper timeout period, an emergency call setup is begun. The emergency call setup may be discontinued at any point by a user abort command. Otherwise, the mobile switching center serving the cellular telephone is alerted to initiate an emergency call. The MSC utilizes location information from the base station of the cellular telephone and emergency information from the home location register of the cellular telephone to contact and provide an emergency operator with emergency information.

20 Claims, 3 Drawing Sheets

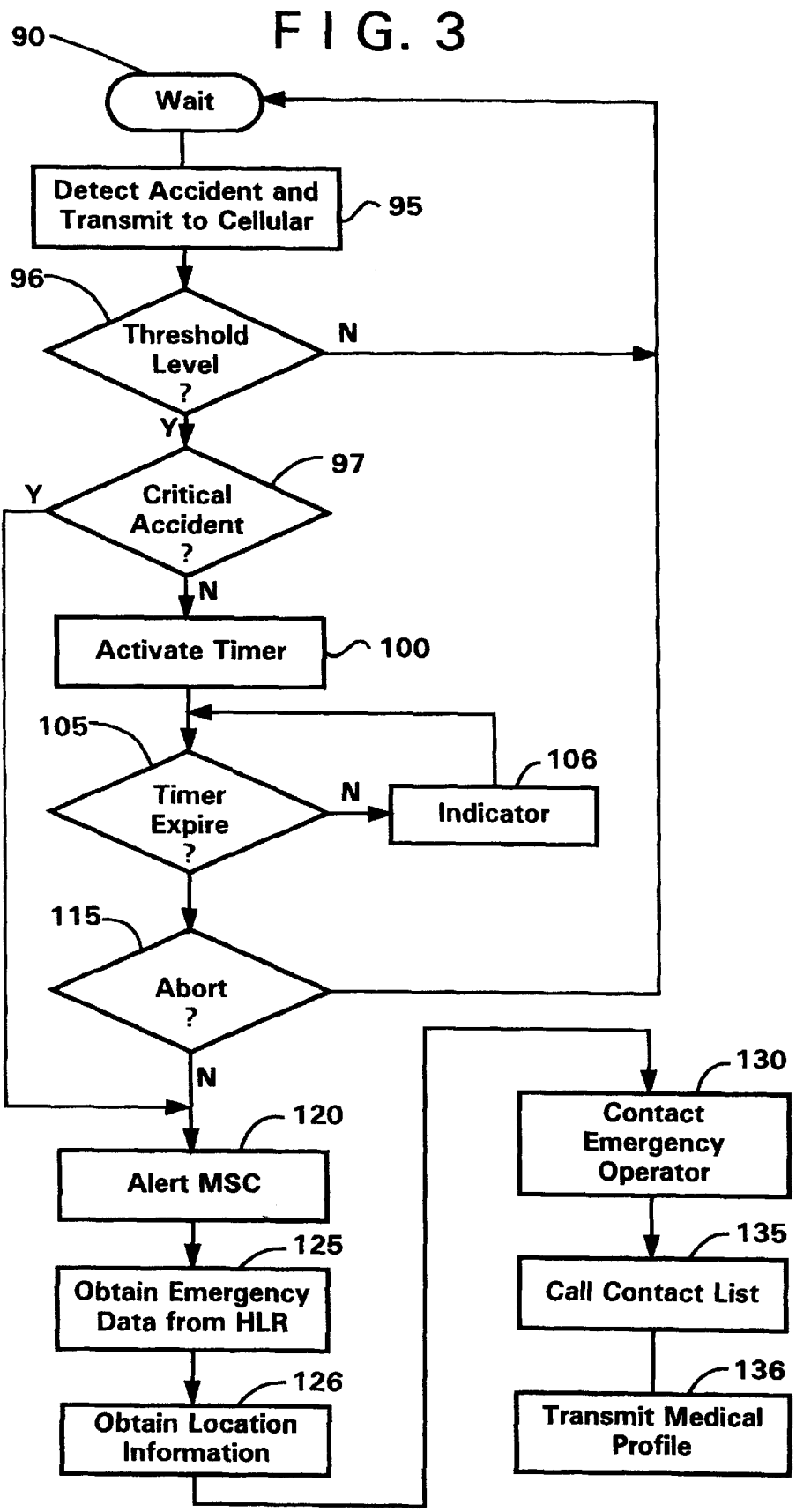

EMERGENCY CALL INITIATOR

BACKGROUND OF THE INVENTION

1. Technical Field of the Invention

The present invention relates to automatic emergency call initiation, and more particularly, to the use of a cellular telephone for automatically initiating an outgoing call in response to a vehicle accident.

2. Description of Related Art

Emergency situation handling is an important reason for the success of cellular system technologies. In the event of an emergency situation, a cellular subscriber can initiate a 911 call to summon police, fire department or ambulance. The subscriber orally conveys the nature of the emergency, the location and other necessary information to the emergency operator. However, this scenario mandates that the subscriber initiate the emergency call. Thus, the subscriber must be conscious, alert and capable of manipulating the equipment in taking the appropriate steps necessary to make an emergency call.

Often, the subscriber may be unconscious and unable to initiate an emergency call. The subscriber may also be in a state of shock or trapped such that they are unable to reach the cellular equipment. In cases such as this, time is of the essence and delay can result in death or permanent injury. Thus, a means for automatically initiating an emergency call through a cellular telephone system in response to a vehicle accident without the need for subscriber initiation would be greatly beneficial.

SUMMARY OF THE INVENTION

The present invention overcomes the foregoing and other problems with an apparatus for initiating an emergency telephone call from a cellular telephone unit in response to a vehicle accident. The apparatus operates in conjunction with the air bag deployment sensors located on many vehicles. Activation of the sensors to deploy the air bags also generates an emergency call activation signal. Additional sensors also may be added to detect for vehicle accidents which may not cause deployment of the air bags in a vehicle. The activation signal transmitted between the sensors and the cellular telephone unit may be through a wireline or non-wireline communications link. The emergency call activation signal activates a timer for delaying initiation of an outgoing call to an emergency number, such as 911.

Upon expiration of the timer period, a processing means associated with the cellular telephone unit initiates an emergency call setup to the mobile switching center servicing the telephone unit. The emergency call setup request from the telephone unit causes the mobile switching center to access an emergency information database including emergency data for the subscriber of the cellular telephone unit. The emergency information database is located within the home location register (HLR) for the cellular unit and includes information for transmission to the emergency operator, such as, medical information, vehicle information, doctor's name, insurance, and other contact persons. The base station provides the cellular telephone unit's location. This information along with the emergency information obtained from the database within the HLR of the cellular telephone unit is transmitted to the emergency operator. Additionally, the database within the HLR may include numbers of appropriate contact persons to be automatically called in the case of an emergency. A one way page to these individuals is initiated by the call setup procedure.

BRIEF DESCRIPTION OF THE DRAWINGS

For a more complete understanding of the present invention, reference is made to the following Detailed Description taken in conjunction with the accompanying drawings wherein:

FIG. 3 is a flow chart illustrating the procedure by which an emergency call is initiated via the cellular telephone of a vehicle involved in an accident.

DETAILED DESCRIPTION OF THE DRAWINGS

Figure 1:
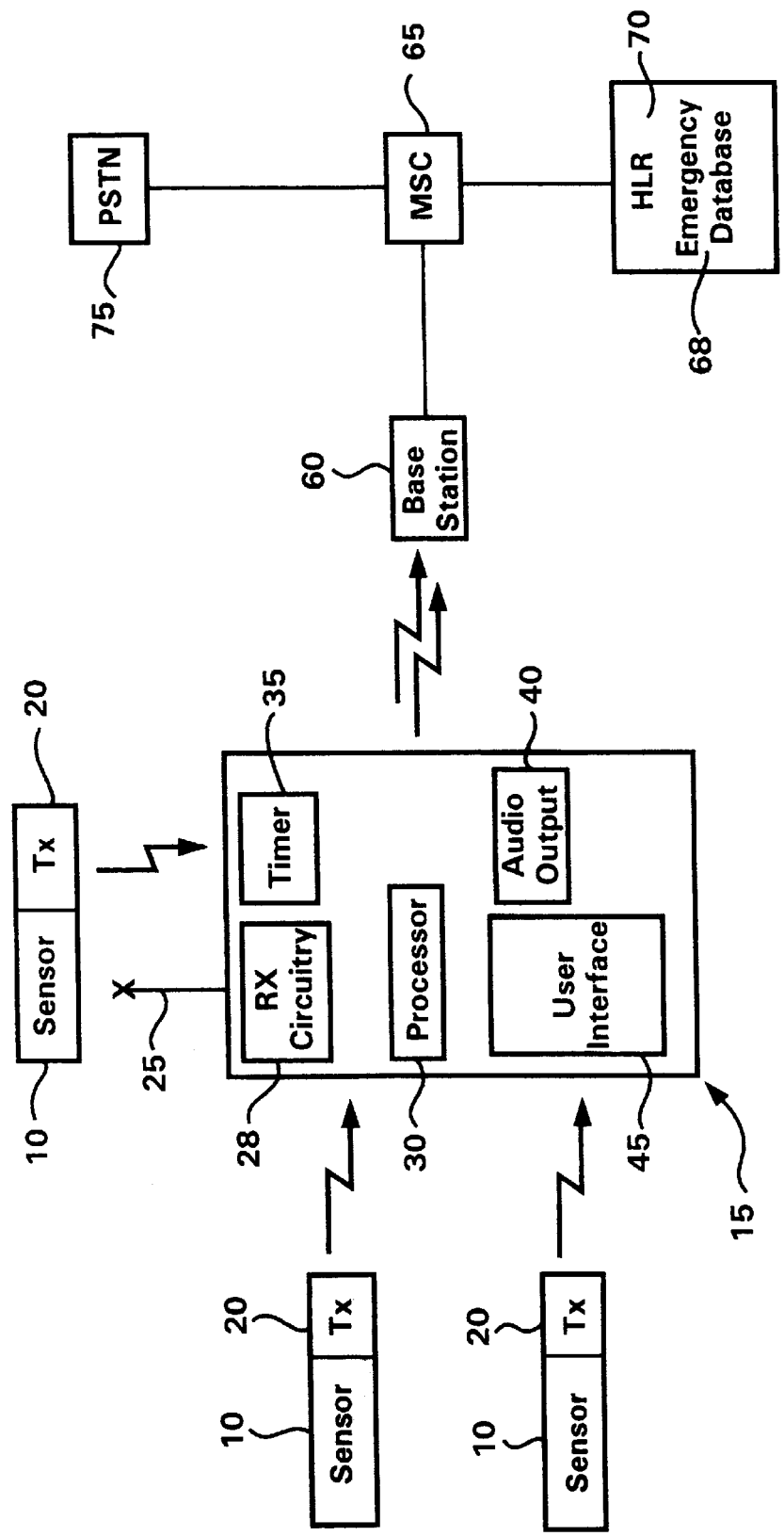
FIG. 1 is a block diagram illustrating the emergency call initiation apparatus of the present invention.

Referring now to the Drawings, and more particularly, to FIG. 1, there is illustrated a block diagram of the emergency call initiation apparatus of the present invention. The apparatus includes a plurality of sensors 10 strategically located about a vehicle to detect an accident involving the vehicle. Preferably, the majority of the sensors 10 comprise those sensors which automatically deploy a vehicle air bag in the event of front or side accident. Additional sensors 10 can be added to the rear and top of the vehicle to detect a rear accident, vehicle rollover or other type of vehicle accident or emergency.

In the event of an accident, the appropriate sensor 10 generates an activation signal indicating that an air bag has been deployed or an accident has occurred, and the activation signal is transmitted to the cellular telephone 15. Transmission of the activation signal between the sensor 10 and cellular telephone 15 is accomplished using a transmitter 20 associated with each sensor 10. The transmitters 20 provide a wireless RF connection between the sensors 10 and the antenna 25 of the cellular telephone 15. The transmitter 20 need only transmit a low power signal as the communications between the sensor 10 and cellular telephone 15 only travel within the limited distance covered by the area of an automobile. While the preferred embodiment is described with respect to the use of a wireless connection between the sensors 10 and the cellular telephone 15, the system may also have a wireline connection between the sensors and the cellular telephone in an alternative embodiment.

In one embodiment, the activation signal transmitted from the sensors 10 is processed by the receiver circuitry 28 of the cellular telephone 15 and provided to a processor 30 programmed to activate an emergency call setup in response to the activation signal. The processor 30 compares the strength of the activation signal to a preselected threshold level and if the signal strength meets this level, the processor activates a timer 35 located within the cellular telephone 15. The timer 35 provides a preselected time delay before initiating an outgoing emergency call in response to detection of a vehicle accident. An audio or visual indication notifies the passengers of activation of the timer 35 and ceases with expiration or cutoff of the timer. The time delay enables the passengers in the vehicle a period of time to gather their wits after an accident. Certain types of signals from the sensors 10, for example, signals indicating a fire or a vehicle rollover, may directly initiate the call rather than the timer 35 since time would be of the essence.

After the time delay period expires the processor 30 initiates emergency call setup and provides an audible indication of this through audio output 40. Alternatively, a short message service (SMS) message, or CDPD message may be initiated upon timer expiration. An individual may cancel initiation of an emergency call through the user interface 45 if no emergency assistance is required. If the individual discontinues the emergency call through the user interface 45, the timer 35 resets and the processor 30 awaits detection of a further activation signal.

Figure 2:
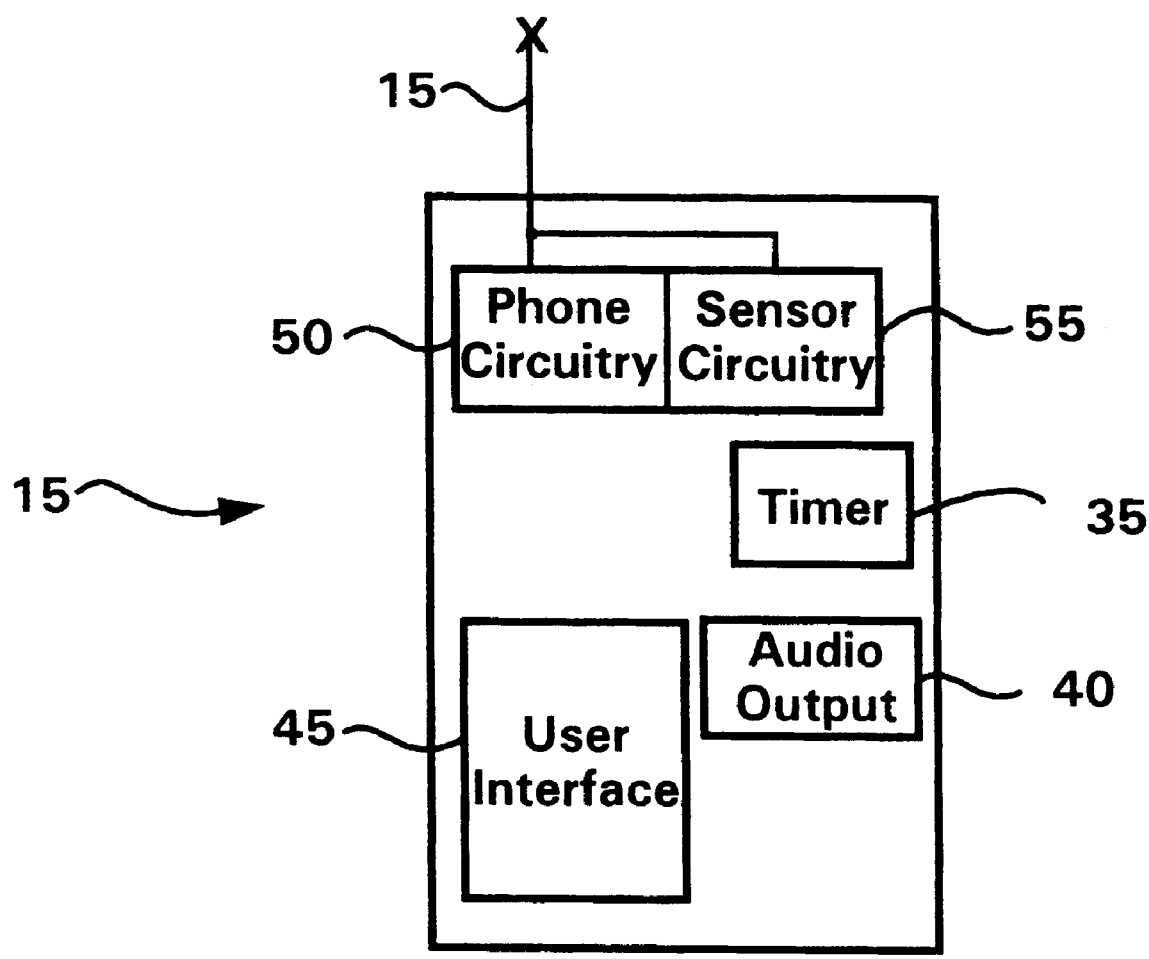
FIG. 2 is a block diagram of an alternative embodiment of the cellular telephone.

Alternatively, as shown in FIG. 2, rather than processing the received activation signal from the transmitter 20 using the processor 30, dual receiver signal circuitry may be utilized to process RF signals received via the antenna 15 of the cellular telephone unit. Phone circuitry 50 processes received cellular signals in a normal fashion. The sensor circuitry 55 processes low power RF signals from the transmitter 20. The sensor circuitry 55 would use hard-wired logic to detect the activation signal from the transmitter 20 and determine whether the signal strength met the threshold requirement necessary to initiate the timer 35 and carry out emergency call setup in the manner discussed previously.

Referring back now to FIG. 1, once the timer 35 has measured the predetermined time period, a call, SMS or CDPD setup procedure is initiated between the cellular telephone 15 and a base station 60. The base station 60 forwards the emergency call setup request and the location of the cellular telephone to the mobile switching center (MSC) 65 responsible for controlling the cellular telephone 15. The MSC 65 contacts the home location register (HLR) 70 for the requesting cellular telephone 15. A database 68 within the subscriber account information for the cellular telephone 15 stores a variety of emergency information associated with the subscriber of the cellular telephone unit 15.

The information stored for forwarding to an emergency operator, may include emergency messages to be transmitted, medical information on the subscriber, vehicle information, doctor's name, and insurance information. The emergency information, including the emergency messages transmitted, may be changed and customized by the user. This is accomplished by accessing the database 68 through the cellular telephone unit 15. This emergency information is forwarded to the MSC 65 controlling the cellular telephone 15. The MSC 65 also contacts the base station 16 to request location information for the cellular telephone 15.

The emergency information and the location information provided by the base station 16 are then forwarded to an emergency operator, for example, a 911 operator, through a public switched telephone network 75. The emergency information can be forwarded to the emergency operator by audio, pager or in short message form. In addition, the emergency information within the database 68 of the subscriber's HLR 70 may include an emergency notification call list. This list might include the subscriber's spouse, parent, or other individuals needing to know of the subscriber's accident and a message to be transmitted. This information is also customizable by the user. The MSC 65 uses this information from the HLR 75 to initiate one-way pages to the individuals on the emergency call list. Selected prerecorded information will be conveyed during these pages to the listed individuals.

Once the emergency call has been initiated to the emergency operator, the MSC 65 may instruct the base station 60 to transmit a continuous loop of emergency information to the cellular telephone unit 15 by SMS or pager message. This information may include emergency medical information on the subscriber, such as a personal medical profile, taken from the emergency database 68 or may include general first aid information to be utilized by passersby at the scene of the accident. By turning the cellular telephone unit 15 off and on, the continuous loop of emergency information is discontinued and the cellular telephone unit 15 may be utilized in the normal fashion.

Referring now to FIG. 3, there is illustrated a flow chart describing the overall method for enabling automatic emergency call initiation. Initially, at step 90, the system waits for initiation of an out-bound emergency call initiation signal from the sensors 10. Once an accident is detected by the sensors 10, the sensors generate an emergency call initiation signal and transmit the signal to the cellular telephone 15 at step 95. The emergency call initiation signal is processed by either the processor 30 (FIG. 1) or sensor circuitry 55 (FIG. 2) to determine whether or not the proper signal level threshold has been reached at inquiry step 96. If so, inquiry step 97 determines if a time critical accident, such as a fire, has been detected. If a critical accident is detected, the MSC is immediately alerted at step 120. Otherwise, the timer is activated at step 100. When inquiry step 96 determines that the signal level threshold has not been reached control is returned to step 90.

Inquiry step 105 monitors the timer 35 for expiration of the timing period. Until timer expiration, a call setup indicator is provided at step 106. Once the timer period expires, inquiry step 115 checks for a user abort command discontinuing the call setup procedure. If an abort command is detected, control passes back to step 90, and the system waits for receipt of an additional emergency call initiation signal. If call setup is not aborted, the call setup procedure alerts, at step 120, the MSC 65 to automatically initiate an emergency call.

At step 125, the MSC 65 contacts the home location register 70 for the cellular telephone 15 and receives all emergency call information contained within the database 68 of the home location register. Cellular telephone 15 location information is retrieved at step 126. This information plus the is then forwarded at step 130 to an emergency operator via an emergency call. Once the emergency call has been sent, the MSC 65 further initiates automatic call setup to other contacts listed in the subscriber's emergency call contact list at step 135 and then subscribers emergency medical profile and/or emergency procedures are transmitted to the mobile station at step 136.

Although a preferred embodiment of the method and apparatus of the present invention has been illustrated in the accompanying drawings and described in the foregoing detailed description, it is understood that the invention is not limited to the embodiment disclosed, but is capable of numerous rearrangements, modifications, and substitutions without departing from the spirit of the invention as set forth and defined by the following claims.

What is claimed is:

1. A system for initiating an emergency call from a cellular telephone in response to a vehicle accident, comprising:

a sensor for generating an activation signal in response to a vehicle accident, wherein the activation signal may be of a first type indicating a first level of urgency or a second type indicating a second level of urgency;

means responsive to the activation signal for initiating an outgoing call sequence, wherein the activation signal is transmitted between the sensor and the means for initiating through a wireless communications link, wherein said means is further responsive to the first and second types of activation signal, wherein initiation of the outgoing call sequence is delayed by a first time period in response to the first type of activation signal and a second time period in response to the second type of activation signal; and a home location register in a cellular communications system configured to store emergency information to be transmitted upon initiation of the outgoing call sequence.

2. The system of claim 1, wherein the means for initiating comprises a processor, including a controlling program actuated by the activation signal, for determining if the activation signal strength meets a preselected threshold level and initiating the outgoing calling sequence if the activation signal meets the preselected threshold level.

3. The system of claim 1 wherein the cellular telephone comprises dual receiver signal circuitry for receiving signals from a telecommunication network and for receiving the activation signal from the sensor via the wireless communications link.

4. The system of claim 1, wherein in response to the first type of activation signal said means immediately initiates the outgoing call sequence and in response to the second type of activation signal said means sets a timer to a length of time enabling a passenger of the vehicle an opportunity to cancel the outgoing call sequence.

5. The system of claim 4, wherein the timer may further be by-passed in response to preselected types of emergencies.

6. The system of claim 1 wherein the sensor comprises a sensor for initiating automatic air bag deployment.

7. The system of claim 1 wherein the home location register further includes at least one number to be called in case of an emergency for each subscriber.

8. The system of claim 1 further including means for providing location information for the cellular telephone.

9. The system of claim 1 wherein the home location register further includes at least one notification number to individuals who should be notified in case of an accident involving the subscriber.

10. The system of claim 1 wherein the home location register further includes emergency procedure information for continuous transmission to the cellular telephone.

11. A system for initiating an emergency call from a cellular telephone in response to a vehicle accident, comprising:

a plurality of sensors for detecting the vehicle accident and generating an activation signal in response thereto, wherein the activation signal may be of a first type indicating a first level of urgency or a second type indicating a second level of urgency;

means responsive to the activation signal for initiating the call activation, wherein initiation of the call activation is delayed by a first time period in response to the first type of activation signal and is delayed by a second time period in response to the second type of activation signal;

a transmitter associated with each sensor for connecting the plurality of sensors with the means for initiating through a wireless communications link; and a database remotely located from the telephone for storing emergency information to be transmitted upon call activation;

wherein the database is configured to be accessed by a mobile switching center.

12. The system of claim 11 wherein the means for initiating comprises a processor, including a controlling program actuated by the activation signal, for determining if the activation signal meets a preselected threshold level and initiating the outgoing calling sequence if the activation signal meets the preselected threshold level.

13. The system of claim 11 wherein the cellular telephone comprises dual receiver signal circuitry for receiving signals from a telecommunication network and for receiving the activation signals from the plurality sensors via the wireless communications link.

14. The system of claim 11, wherein in response to the first type of activation signal said means immediately initiates the call activation and in response to the second type of activation signal said means sets a timer to a length of time enabling a passenger of the vehicle an opportunity to cancel the call activation.

15. The system of claim 11, further including means for aborting call activation.

16. The system of claim 11, further including means for providing location information for the cellular telephone.

17. A method for automatically initiating an emergency call through a cellular telephone in response to a vehicle accident, comprising the steps of:

generating a call activation signal in response to a vehicle accident, wherein the call activation signal may be of a first type indicating a first level of urgency or a second type indicating a second level of urgency;

sending the call activation signal through a wireless communications link to the cellular telephone;

activating an emergency call setup, through the cellular telephone, to an emergency operator in response to the call activation signal;

delaying activation of the emergency call setup by a first time period in response to the first type of call activation signal and by a second time period in response to the second type of call activation signal;

retrieving emergency information from a home location register; and transmitting the emergency information to the emergency operator.

18. The method of claim 17 further including the step of:

retrieving location information for the cellular telephone; and transmitting the location information to the emergency operator.

19. The method of claim 17, wherein the first type of call activation signal sets the first time period to immediately initiate the emergency call setup and the second type of activation signal sets the second time period to a length of time enabling a passenger of the vehicle an opportunity to cancel the emergency call setup.

20. The method of claim 17 further including the step of receiving the call activation signal through the cellular telephone, wherein the cellular telephone comprises dual circuitry for receiving signals from a telecommunication network and for receiving the call activation signal via the wireless communications link.

* * * * *